United States Patent
Buschbeck et al.

(10) Patent No.: US 9,610,638 B2
(45) Date of Patent: Apr. 4, 2017

(54) CLAMPING DEVICE

(71) Applicant: Schenck RoTec GmbH, Darmstadt (DE)

(72) Inventors: Andreas Buschbeck, Bickenback (DE); Matthias Breitwieser, Gross-Umstadt (DE); Dieter Peiter, Rossdorf (DE); Angelika Stork, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 214 days.

(21) Appl. No.: 14/413,053

(22) PCT Filed: Aug. 28, 2013

(86) PCT No.: PCT/EP2013/067762
§ 371 (c)(1),
(2) Date: Jan. 6, 2015

(87) PCT Pub. No.: WO2014/033148
PCT Pub. Date: Mar. 6, 2014

(65) Prior Publication Data
US 2015/0202694 A1    Jul. 23, 2015

(30) Foreign Application Priority Data
Aug. 30, 2012   (DE) .......... 10 2012 108 066

(51) Int. Cl.
*B23B 31/26*     (2006.01)
*G01M 1/04*     (2006.01)

(52) U.S. Cl.
CPC ............. *B23B 31/265* (2013.01); *G01M 1/04* (2013.01); *B23B 2260/136* (2013.01); *Y10T 279/1008* (2015.01)

(58) Field of Classification Search
CPC .. B23B 31/265; B23B 2260/136; G01M 1/04; Y10T 279/1008
See application file for complete search history.

(56) References Cited

U.S. PATENT DOCUMENTS 5,827,021 A   10/1998   Klement
6,568,888 B2   5/2003   Hangleiter
(Continued)

FOREIGN PATENT DOCUMENTS

CN   1398699 A    2/2003
CN   101743085 A   6/2010
(Continued)

OTHER PUBLICATIONS

International Search Report of PCT/EP2013/067762, mailed Jan. 7, 2014.
Chinese Office Action in CN 201380031299.0, dated Nov. 24, 2015.

*Primary Examiner* — Eric A Gates
*Assistant Examiner* — Paul M Janeski
(74) *Attorney, Agent, or Firm* — Collard & Roe, P.C.

(57) ABSTRACT

Disclosed is a clamping device (1) for clamping a toolholder of a drilling, milling or grinding tool in a balancing machine, comprising a receiver unit (2) having a receiving opening (9) for the coupling shaft of the toolholder and a collet (10), in which the shaft (20) of an actuator (18) for actuation of the collet (10) is slidably guided in a centrally located bore (19) of the receiver unit (2). The shaft (20) has at its one end a load-applying body (22) upon which a plurality of compression springs (30, 31) take support to enable the collet (10) to be tightened. The compression springs (30, 31) are arranged and/or configured in such a way that the spring loads acting (Continued)

on the load-applying body (22) with the collet (10) tightened act on the load-applying body (22) asymmetrically relative to the axis of the shaft (20).

9 Claims, 1 Drawing Sheet

(56) References Cited

U.S. PATENT DOCUMENTS

| | | |
|---|---|---|
| 6,612,791 B1 | 9/2003 | Haimer |
| 8,556,554 B2 | 10/2013 | Hangleiter |
| 2003/0024357 A1 | 2/2003 | Hofmann et al. |

FOREIGN PATENT DOCUMENTS

| | | |
|---|---|---|
| DE | 199 61 451 A1 | 6/2001 |
| DE | 10 2005 031802 A1 | 1/2007 |
| DE | 10 2008 050 417 B3 | 5/2010 |
| EP | 0 557 240 A2 | 8/1993 |
| EP | 0 782 896 A1 | 7/1997 |
| EP | 1 184 113 A1 | 3/2002 |
| WO | 00/45983 A1 | 8/2000 |

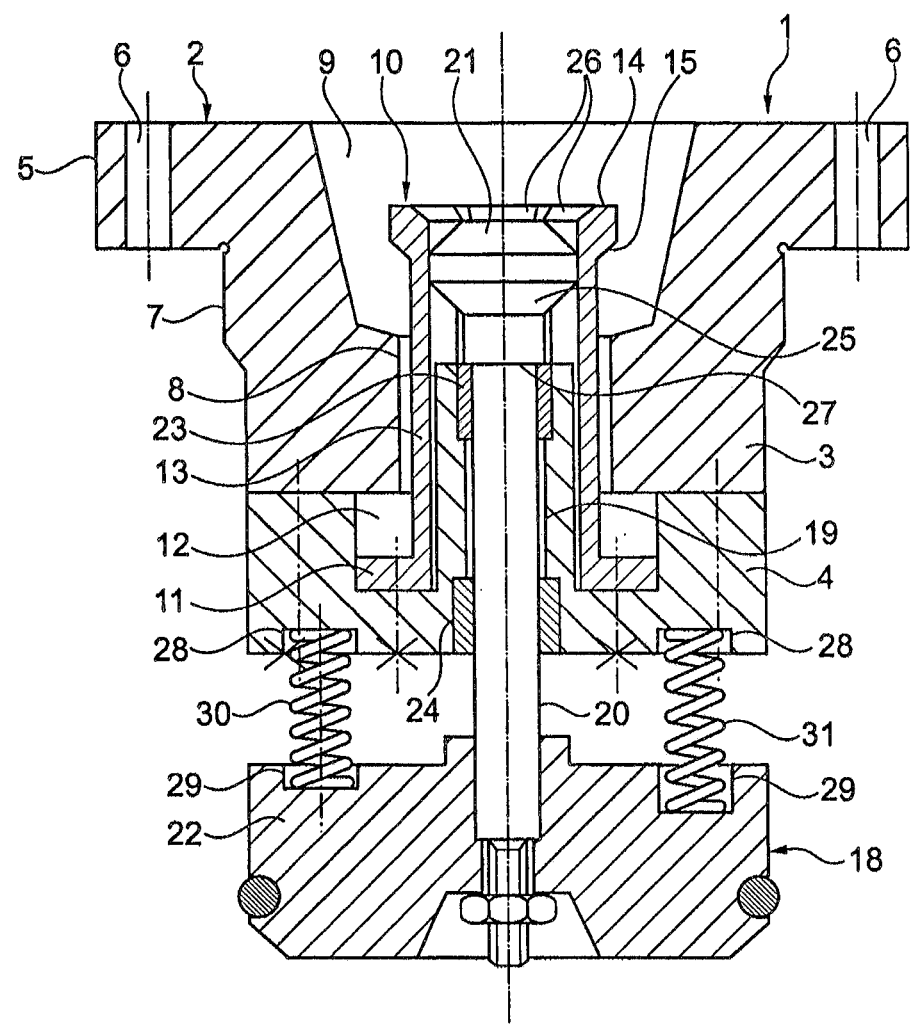

CLAMPING DEVICE

CROSS REFERENCE TO RELATED APPLICATIONS

This application is the National Stage of PCT/EP2013/067762 filed on Aug. 28, 2013, which claims priority under 35 U.S.C. §119 of German Application No. 10 2012 108 066.6 filed on Aug. 30, 2012, the disclosure of which is incorporated by reference. The international application under PCT article 21(2) was not published in English.

This invention relates to a clamping device for clamping a machine part configured to rotate about an axis of rotation, in particular a toolholder of a drilling, milling or grinding tool, in a balancing machine.

Clamping devices of the type referred to are primarily employed to clamp tools which are adapted to be driven at high rotational speeds in a balancing machine. The balancing of such tools is subject to high demands since inadequately balanced tools may adversely affect the quality of the process. To be able to satisfy the high demands placed on the balancing quality, precise centrally located clamping of the tools to be balanced is necessary using a clamping device arranged on the spindle of the balancing machine.

WO 00/45983 A1 discloses a clamping device provided in a balancing machine for clamping a toolholder, in which a base unit attached to a machine spindle driven for rotation about an axis of rotation includes a receiving opening centrally located with respect to the axis of rotation and adapted to receive axially therein a coupling shaft of the toolholder. Arranged in the receiving opening is a collet which acts on the coupling shaft and is actuatable by a collet actuator guided on, and axially adjustable relative to, the base unit. The collet actuator is doubly guided on the base unit by two pairs of sliding surfaces. In order to achieve a high degree of guiding accuracy, these pairs may be configured as interference fits, with the consequence, however, that the collet actuator is very difficult to adjust relative to the base unit. More lenient tolerances allow the collet actuator to be adjusted with greater ease. On the other hand, radial run-outs caused by such tolerances may enter the measurement results and impair repeatability of the measurements considerably.

To avoid these drawbacks, it is furthermore known from the publication referred to to guide the collet actuator axially by means of a rolling-body arrangement having rolling bodies which roll off on rolling surfaces of the base unit and the collet actuator. The purpose of the rolling-body arrangement is to enable ease of movement of the collet actuator while yet providing an accurate axial guiding function, in particular when the rolling bodies are installed with bias between the base unit and the collet actuator.

It is an object of the present invention to provide a clamping device of the type referred to, which allows smooth and easy movement in operation and affords economy of manufacture.

According to the present invention, this object is accomplished by a clamping device including the features recited in claim 1. Advantageous embodiments of the clamping device are recited in the further claims.

The clamping device of the present invention comprises a receiver unit having a receiving opening centrally located relative to the axis of rotation and adapted to receive axially therein a coupling shaft of a machine part, a collet arranged in the receiving opening, and an actuator guided on the receiver unit for axial movement relative thereto for actuation of the collet, wherein the actuator includes a shaft axially slidably guided in a centrally located bore of the receiver unit, a clamping body at one end of the shaft for actuation of the collet, a load-applying body at the other end of the shaft, and a plurality of compression springs arranged between the receiver unit and the load-applying body, and wherein the compression springs are arranged and/or configured in such a way that the spring loads acting on the load-applying body with the collet tightened are asymmetrical relative to the axis of the shaft.

The present invention is based on the realization that a high balancing quality is also achievable in cases where the clamping device exhibits a limited out-of-balance condition in the clamping position in which unbalance is measured. This unbalance can be measured accurately and is separable, by way of calculation, from the unbalance component of the machine part in the detection of the aggregate unbalance of clamping device and machine part to be balanced. It is, however, essential for such an approach that the measured unbalance of the clamping device, which may be caused, for example, by an eccentricity of the actuator guided for ease of sliding motion and therefore not with perfect zero clearance, not change upon each clamping operation but retain its position and magnitude upon each clamping operation.

According to the present invention, this is accomplished by the compression springs loading the load-applying body asymmetrically relative to the shaft. As a result, the compression springs fixedly seated between the receiver unit and the load-applying body produce a torque acting on the load-applying body and the shaft that seeks to rotate the load-applying body and the shaft about an axis standing vertically on a defined plane passing through the shaft axis. This torque causes the shaft to be urged in a direction lying in this plane against the wall of the centrally located bore of the receiver unit in which it is guided, so that in occupies, as a result of the clearance existing in the guide, a defined eccentric position in the bore of the receiver unit. Correspondingly, the load-applying body fixedly connected with the shaft assumes an equally eccentric position. This stable eccentricity resulting from the asymmetrical forces of the compression springs produces a defined unbalance capable of being detected in a test run and corrected mathematically in subsequent unbalance measurements. The resulting eccentricity is determined in respect of its magnitude by the clearance of the sliding guide, and in respect of its direction by the arrangement and/or design of the compression springs and is accordingly repeatable for each clamping operation. A clearance-free guiding of the actuator by rolling-body arrangements and tight fits can therefore be dispensed with, which enables the manufacturing cost of the clamping device to be reduced significantly.

Conventionally, the compression springs of the clamping device are biased when being installed. When the actuator of the clamping device is moved into the clamping position, the compression springs are tensioned beyond their initial bias. To achieve an asymmetrical loading of the load-applying body in simple manner, the present invention may provide for at least one of the compression springs to be biased a greater amount than the other springs. The greater spring force of the more strongly biased compression spring is achievable by a reduced installed length or by a longer spring length in the presence of a given installed length.

Another advantageous possibility of achieving the asymmetrical loading may also include the use of at least one compression spring having a steeper spring characteristic than the other compression springs.

According to another proposal of the invention, the asymmetrical loading of the load-applying body may be accomplished by a non-symmetrical arrangement of several compression springs on the load-applying body. In this event, the compression springs may be identical and installed with the same bias.

The number of compression springs may be even or odd. The use of five compression springs has proven to be particularly advantageous, which springs are evenly spaced apart on the load-applying body, with two non-neighboring compression springs having an equal higher bias and the other compression springs an equal lower bias. Such an arrangement of the compression springs accomplishes a fairly reliable alignment of the torque loads and hence an eccentricity of the actuator relative to the receiver unit which is repeatable within narrow limits.

In the clamping device of the present invention, the compression springs may be held in bores of the load-applying body and the receiver unit, with the difference in bias of the compression springs being accomplishable by providing for different depths of the bores.

Advantageously, the shaft of the actuator may be carried in slide bushings arranged in the bore of the receiver unit with allowance for an amount of play that ensures ease of movement. Self-lubricating slide bushings may be used for this purpose.

To be able to move the actuator in opposition to the force of the compression springs into a release position pneumatically or hydraulically, the load-applying body may be a piston of a piston-and-cylinder arrangement mounted coaxially in the rotary spindle of a balancing machine.

The present invention will be described in greater detail in the following with reference to an embodiment illustrated in the accompanying drawing. The drawing shows a longitudinal section through a clamping device of the invention.

The clamping device 1 shown is configured for insertion into the open end of a hollow spindle of a balancing machine. The clamping device 1 includes a receiver unit 2 composed of two parts connected by screws, a receiving part 3 and a support part 4. A flange 5 having mounting bores 6 in the receiving part 3 serves to attach the receiver unit 2 to the frontal surface of the hollow spindle. For accuracy of central location relative to the hollow spindle, the receiving part 3 has on its outside a locating surface 7. Extending through the receiving part 3 in axial direction is a through bore 8 having a centrally located receiving opening 9 configured to receive a standardized hollow steep-taper coupling shaft of a tool. It will be understood, of course, that the receiving part 3 may also be provided with a different shape of receiving opening to receive different shapes of coupling shaft.

Held in the through bore 8 is a collet 10 having a flange 11 for securing it by means of screws in an annular recess 12 formed in the support part 4. The collet 10 includes a sleeve portion 13 which is multiply slotted in longitudinal direction along part of its length and extends into the receiving opening 9 where it is provided with a clamping flange 14 at its slotted end. On clamping a coupling shaft inserted into the receiving opening 9, the clamping flange 14 embraces with a clamping surface 15 a clamping bead formed in the opening of the coupling shaft.

Actuation of the collet 10 is performed by means of an actuator 18 including a shaft 20 arranged in a central bore 19 of the support part 4, the shaft mounting at its end associated with the collet 10 a clamping body 21 while its opposite end, which extends out of the support part 4, is fixedly secured to a disk-shaped load-applying body 22. Between the clamping body 21 and the load-applying body 22 the shaft 20 is provided with a cylindrical guiding portion and is guided in slide bushings 23, 24 arranged in the bore 19. The guide portion of the shaft 20 has in the slide bushings 23, 24 a clearance of the order of between 30 and 50 µm, thereby ensuring ease of axial movability of the shaft 20. The clamping body 21 has a conical clamping surface 25 coacting with conical clamping surfaces 26 at the slotted end of the sleeve portion 13 in order to spread the clamping flange 14 apart. At its end close to the shaft 20, the clamping body 21 forms a stop 27 limiting the movement of the actuator 18 in a direction increasing the distance between the support part 4 and the load-applying body 22.

Provided in the oppositely facing surfaces of the support part 4 and the load-applying body 22 are in like arrangement oppositely facing mounting bores 28, 29 in which biased compression springs 30, 31 configured as helical compression springs are seated. The compression springs 30, 31 operate to maintain the actuator 18 in the stop position illustrated in the drawing in which the clamping body 21 bears with its stop 27 against the support part 4.

The compression spring 30 has a greater number of coils and a shorter installed length than the compression spring 31. In consequence, the compression spring 30 generates a higher biasing force which produces on the load-applying body 22 a torque acting counterclockwise about a vertical to the drawing plane. The torque is supported on the slide bushings 23, 24 by means of the shaft 20. This causes the shaft 20 to be urged into engagement with the slide bushing 24 in the direction of the compression spring 31 and into engagement with the slide bushing 23 in the direction of the compression spring 30. In the clamping situation described and the existing sliding clearance notwithstanding, the shaft 20 is thereby caused to occupy a clearly defined, clearance-free position within the slide bushings 23, 24, which position is determined exclusively by the asymmetrical loading of the load-applying body 22 by means of the compression springs 30, 31 and is therefore repeatable on each clamping operation.

The clamping position of the actuator 18 described in the foregoing and illustrated in the drawing does not exactly reflect the clamping position during clamping of a coupling shaft. Rather, when a coupling shaft is clamped, the actuator 18 is initially displaced in the direction of the receiving opening 9 by tensioning the compression springs 30, 31 until the thick end of the clamping body 21 exits the collet 10, thereby enabling the collet 10 to contract resiliently and reduce the outer diameter of the clamping flange 14 in order to enable the coupling shaft to be inserted into the receiving opening 9. This release movement of the actuator 18 is conventionally produced by pneumatic pressure acting on the load-applying body 22 arranged in a cylinder. For subsequent clamping of the inserted coupling flange, the pressure acting on the load-applying body 22 is lowered, and the force of the compression springs 30, 31 acts to urge the clamping body 21 with its clamping surface 25 against the clamping surfaces 26 of the collet 10. As a result, the collet 10 expands, holding the coupling shaft firmly clamped in the receiving opening 9. In the tensioned end position of the actuator 18 in which all the forces are at equilibrium by the forces generated by the compression springs 30, 31, the clamping body 21 takes support on the collet 10, while the stop 27 is still at a distance from the adjacent end of the support part 4. In this clamping position, the spring force of the compression springs 30, 31 is higher than in the above-descried stop position, but also the difference between the forces of the compression springs 30, 31 and the torque thereby produced are correspondingly higher so that the above-described radial forcible engagement of the shaft 20 with the slide bushings 23, 24 is equally effective. In this manner, the clamping device 1, when in clamped position, occupies a clearly defined position in the presence of a defined eccentricity of the shaft 20 and the load-applying body 22. Any resulting unbalance can be detected and corrected in the unbalance measurement.

In the embodiment described in the foregoing, only two compression springs are shown for the sake of simplicity. Typically, however, clamping devices of the type described use a greater number of compression springs. In order to achieve the asymmetrical loading of the load-applying body necessary according to the invention, it is therefore suitable to provide several ones of the existing compression springs with a higher bias. An arrangement of five compression springs has proven to be particularly advantageous, in which the springs are evenly spaced apart and equidistant from the axis of the shaft between the receiver unit and the load-applying body, with at least two, not directly neighboring compression springs producing a spring force higher than the other compression springs. In this arrangement, the two stronger compression springs and the third compression spring arranged therebetween produce a clearly aligned torque enabling the actuator in the clamping position to be moved into a clearance-free eccentric position with repeat accuracy.

The invention claimed is:

1. A clamping device for clamping a machine part configured to rotate about an axis of rotation in a balancing machine, comprising
    a receiver unit having a receiving opening centrally located relative to the axis of rotation and adapted to receive axially therein a coupling shaft of the machine part,
    a collet arranged in the receiving opening, and
    an actuator guided on the receiver unit for axial movement relative thereto for actuation of the collet,
    wherein the actuator includes
    a shaft axially slidably guided in a centrally located bore of the receiver unit, wherein the shaft is carried in slide bushings with allowance for play,
    a clamping body at one end of the shaft for actuation of the collet,
    a load-applying body at the other end of the shaft, and
    a plurality of compression springs arranged between the receiver unit and the load-applying body, wherein the compression springs are arranged and/or configured in such a way that the spring loads acting on the load-applying body with the collet tightened are asymmetrical relative to the axis of the shaft.

2. The clamping device according to claim 1, wherein the compression springs are biased, with at least one of the compression springs being biased by a greater amount than the other springs.

3. The clamping device according to claim 1, wherein the spring characteristic of at least one of the compression springs differs from the spring characteristics of the other ones of the compression springs.

4. The clamping device according to claim 1, wherein the compression springs are non-symmetrically arranged on the load-applying body.

5. The clamping device according to claim 1, wherein the number of compression springs is odd.

6. The clamping device according to claim 1, wherein five compression springs are evenly spaced apart on the load-applying body, with two non-neighboring compression springs having an equal higher bias and the other compression springs an equal lower bias.

7. The clamping device according to claim 1, wherein the ends of the compression springs are held in mounting bores of the load-applying body and the receiver unit.

8. The clamping device according to claim 1, wherein the load-applying body is a piston of a piston-and-cylinder arrangement constructed for pneumatically moving the actuator into a release position.

9. A clamping device for clamping a machine part configured to rotate about an axis of rotation in a balancing machine, comprising
    a receiver unit having a receiving opening centrally located relative to the axis of rotation and adapted to receive axially therein a coupling shaft of the machine part,
    a collet arranged in the receiving opening, and
    an actuator guided on the receiver unit for axial movement relative thereto for actuation of the collet,
    wherein the actuator includes
    a shaft axially slidably guided in a centrally located bore of the receiver unit,
    a clamping body at one end of the shaft for actuation of the collet,
    a load-applying body at the other end of the shaft, and
    a plurality of compression springs arranged between the receiver unit and the load-applying body, wherein the compression springs are arranged and/or configured in such a way that the spring loads acting on the load-applying body with the collet tightened are asymmetrical relative to the axis of the shaft, and
    wherein five compression springs are evenly spaced apart on the load-applying body, with two non-neighboring compression springs having an equal higher bias and the other compression springs an equal lower bias.

* * * * *